(No Model.)
T. G. LEE.
HAY RAKE.
No. 488,713. Patented Dec. 27, 1892.
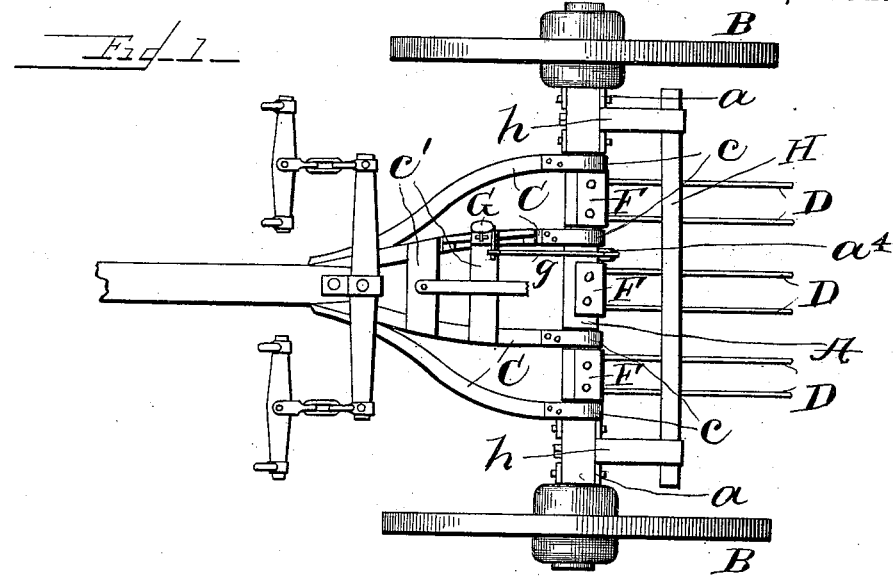
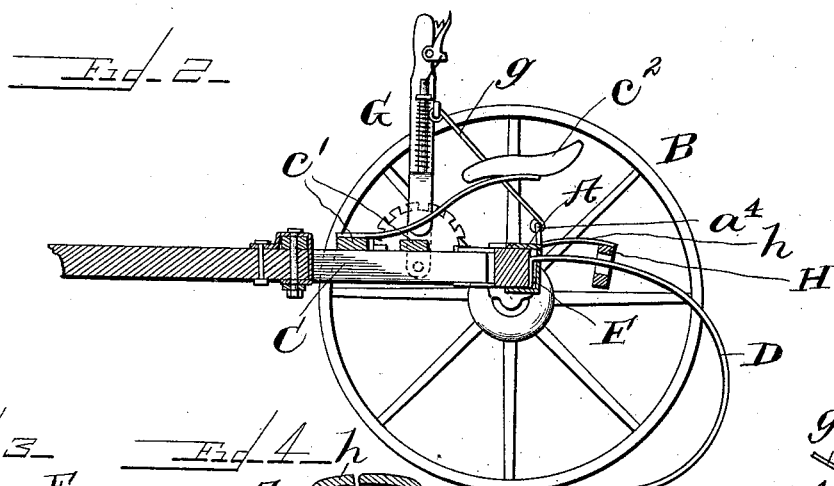
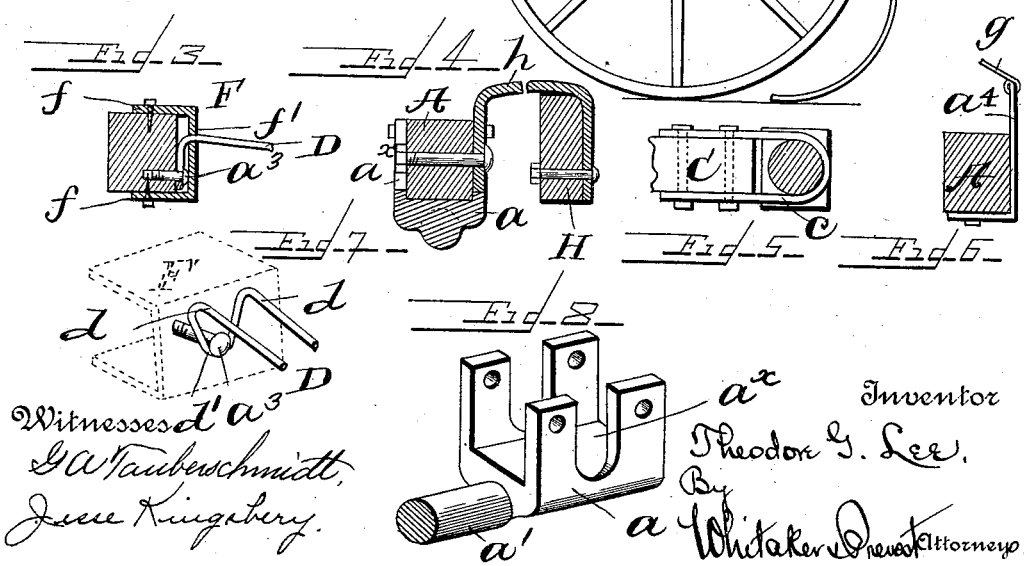
Witnesses
G. A. Tauberschmidt,
Jane Kingsbury.
Inventor
Theodor G. Lee.
By Whitaker & Prevost Attorneys.

UNITED STATES PATENT OFFICE.

THEODORE G. LEE, OF CUTLER, OHIO.

HAY-RAKE.

SPECIFICATION forming part of Letters Patent No. 488,713, dated December 27, 1892.

Application filed July 16, 1892. Serial No. 440,274. (No model.)

*To all whom it may concern:*

Be it known that I, THEODORE G. LEE, a citizen of the United States, residing at Cutler, in the county of Washington and State of Ohio, have invented certain new and useful Improvements in Hay-Rakes; and I do hereby declare the following to be a full, clear, and exact description of the invention, such as will enable others skilled in the art to which it appertains to make and use the same.

My invention is an improvement in hay rakes and consists in the novel features of construction and combination hereinafter fully described.

In the accompanying drawings I have illustrated one form in which I have contemplated embodying my invention and the said invention is fully disclosed in the following description and claims.

Referring to the drawings, Figure 1 is a top plan view of a horse hay rake embodying my invention. Fig. 2 is a central longitudinal section of the same. Fig. 3 is a detail sectional view of the axle showing the devices for attaching the rake teeth thereto. Fig. 4 is a sectional view of the axle through one of the axle casings. Fig. 5 is a detail view showing the manner of attaching the tongue to the axle. Fig. 6 is a detail view showing the device secured to the axle for tilting the same and elevating the rakes. Fig. 7 is a detail view showing the manner of attaching the teeth to the axle. Fig. 8 is a detail view of one of the axle casings.

In the drawings A represents the axle of my improved hay rake and B B the wheels, mounted upon and supporting the same. The axle A is preferably made of wood for lightness and is also preferably of square or other polygonal shape as shown in cross section Figs. 2, 3, 4 and 6. Adjacent to either end I provide the axle A with the axle casings $a$, see Figs. 1 and 8, which are preferably formed of metal and secured to the axle by bolts or screws and are provided each with a trunnion $a'$, which engages the box of the wheel. The casings $a$ have side portions adapted to engage the sides of the polygonal axle, and bottom portions to engage the lower side, and said casings are formed so as to fit the axle closely and form a strong connection therewith. I also prefer to provide the side walls of casings $a$ with recesses $a^x$ to make them lighter and for a purpose hereinafter to be explained.

At intervals the axle A is provided with cylindrical portions, see Figs. 1 and 5, which are engaged by metallic straps $c$ secured in suitable manner to the beams C C, which form the body of the rake, and said beams are connected at their forward ends with a pole or shafts, by which the device is drawn through the field. The beams C will also be provided with suitable cross bars $c'$ and a driver's seat $c^2$, if desired. The beams C C and cross bars $c'$ and the parts connected therewith constitute what I term the frame or body of the machine.

D D are the spring teeth, which are rigidly secured to the axle A and are preferably attached in pairs, each pair of teeth being formed from a single piece of material having its central portion secured to the axle and its two ends forming the two spring teeth.

In securing the teeth to the axle I provide the axle A with a series of headed pins or bolts $a^3$, see Figs. 3 and 7, and the portion of the teeth which is to be secured to the axle is bent substantially at right angles at $d$ to form a loop $d'$ which engages the head of one of the pins $a^3$. I then employ a clip F which is preferably made of metal and is bent to provide two flanges or walls $ff$ to engage the upper and lower faces of the axle A, and a vertically disposed wall $f'$ which is perforated to allow the teeth to pass through it so that the bends $d$ of the teeth are adjacent to said apertures as shown in Fig. 3. The bent portion or loop of the teeth prevents the teeth from being disengaged from the apertures, and when the clip is secured to the axle by bolts or screws, or other desired means, the teeth are held at two points by the headed pin $a^3$ and by the clip F thus holding the teeth rigidly against any movement except such as is permitted by the spring of the same. The bending of the doubled portion of the tooth, forms a vertically disposed portion which is held by the headed pin and clip, firmly against the axle and thus affords the tooth a long bearing which makes its connection with the axle very secure. The axle being connected to the frame or body of the rake by the straps $c$, is permitted to turn in said straps, and when said axle is turned or rotated in a direction forward, with respect to the main body the teeth, being rigidly secured to said axle, will be raised from the ground, and the materials gathered by the teeth will be dropped. I effect this turning of the axle to dump the load, by means of a hand lever G pivotally secured to the frame or body of the rake, provided with the usual pawl, and ratchet segment, and connected to the axle by means of a link $g$ extending from said lever to a bracket arm $a^4$, which has its lower end connected by bolts or screws to the axle A, in such a manner that the movement of the lever G forward will partially rotate or oscillate the axle and lift the teeth from the ground.

It will be noticed by reference to Figs. 2, 4 and 8 that the trunnions $a'$ upon which the wheels are mounted, are below the center of the axle A. It will thus be seen that as the axle is tilted forward by the lever G, the weight of the frame, and the driver will tend to depress the axle, and assist the operator to raise the rake teeth. By means of the pawl and notched or ratchet segment the rake-teeth may be set and maintained in any desired position. In rear of axle A is a cleaner bar H which extends transversely of the teeth and has suitable slots therein which are engaged by the teeth of the rake. This bar is supported by spring brackets $h$ the ends of which are secured to the axle A, and preferably engage the recesses $a^\times$ of the casings $a$, thus preventing any lateral movement of said brackets, with respect to the casings. When a quantity of hay has accumulated in the rake-teeth, it will be forced up into engagement with the cleaner bar which will yield slightly under the pressure of the hay. When the rake teeth are lifted the spring brackets will be relieved of pressure and the cleaner will spring back and thereby assist in pushing the hay from engagement with the teeth of the rake. The bar H will also prevent the hay from working up too far on the teeth.

What I claim and desire to secure by Letters Patent is:—

1. In a rake the combination with the supporting axle, and its wheels, of the teeth, the headed pins for engaging portions of said teeth and the clips secured to the axle and having portions engaging said teeth in a different horizontal plane from the headed pins, substantially as described.

2. In a rake the combination with the polygonal axle, of the casings having recessed vertical walls to engage said axle and provided with trunnions adapted to be engaged by the supporting wheels, rake teeth rigidly secured to said axle, means for oscillating said axle to raise and lower the teeth, the cleaner bar and the spring brackets therefor secured to said axle and engaging the recesses in said casing walls, substantially as described.

3. In a rake the combination with the axle and supporting wheels revoluble with respect thereto of the teeth secured rigidly to said axle in pairs, each pair of teeth being formed from one piece of metal and having an angularly bent loop portion adjacent to said axle, a headed pin for engaging said loop, a clip secured to said axle and having apertures engaging said teeth adjacent to said bent portion, and means for oscillating said axle to raise and lower the teeth, substantially as described.

In testimony whereof I affix my signature in presence of two witnesses.

THEODORE G. LEE.

Witnesses:
   VIOLA RUSSELL,
   G. H. GIDDINGS.